April 14, 1970   W. E. GERMANI   3,505,715
CUTTING TOOLHOLDER AND INSERT
Filed Jan. 21, 1969
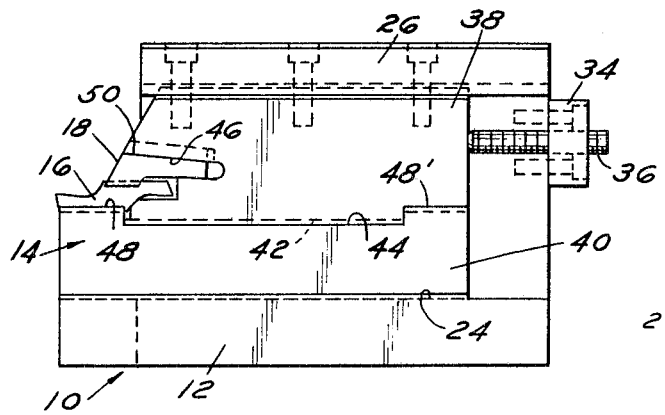
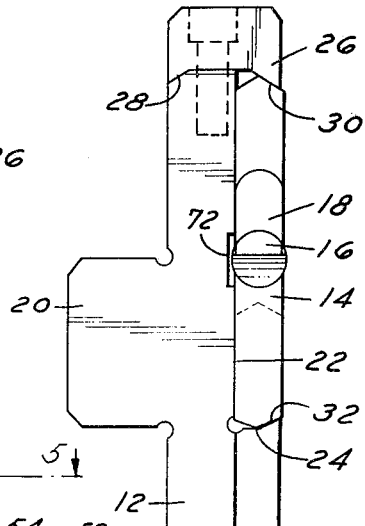
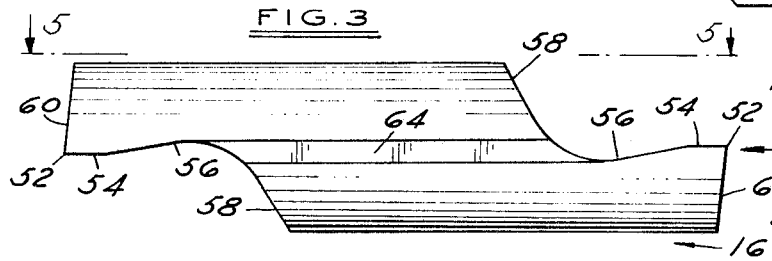
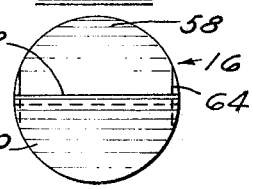
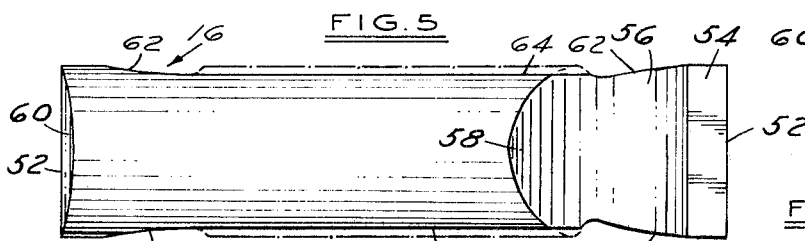
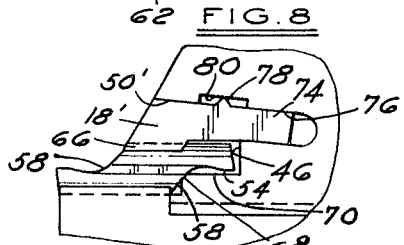
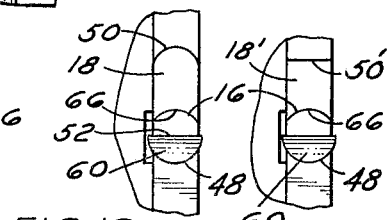
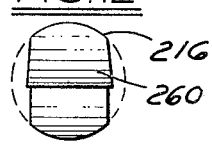
INVENTOR
WILLIAM E. GERMANI
BY
Farley, Forster & Farley
ATTORNEYS

United States Patent Office 3,505,715
Patented Apr. 14, 1970

3,505,715
CUTTING TOOLHOLDER AND INSERT
William E. Germani, Metamora, Mich., assignor to The Valeron Corporation, a corporation of Michigan
Filed Jan. 21, 1969, Ser. No. 792,503
Int. Cl. B26d 1/00
U.S. Cl. 29—96  7 Claims

ABSTRACT OF THE DISCLOSURE

A cutting tool including a blade holder for cylindrical inserts, with wedge means for retaining the insert, means for retaining the insert, means for retaining the wedge in the holder when the insert is changed, and a two-piece construction for readily renewing the insert seat. Also directed to a particular form of cylindrical insert and means of obtaining side clearance therefor.

BACKGROUND OF THE INVENTION

In cut-off tools it is desirable to have a reserve seat for the cutting element because of damage to the seat which can occur when the cutting tip or edge of the insert fails.

In clamp type cut-off tools, which use a blade holder, this is accomplished by having a double-ended blade, or a blade with a part under the insert that can be renewed along with the insert. The overhanging clamp that holds the insert on the blade is loosened, to change the insert, and the blade, or blade part, which is held by threaded fasteners to the side face of the blade holder, is loosened, removed and turned end-for-end, or replaced.

It follows that renewing the seat or support for the insert is not particularly simple and that some time is involved to make the tool change. In addition, since the blade must be securely fastened to the holder, and also be changed or reversed, there is little or no latitude for any fore and aft adjustment of the blade, should this be desirable.

In cut-off tool blades with wedge slots, there are additional problems in providing a renewable seat for the insert, since the seat must be part of the wedge slot, and a double-ended blade seems the only answer; but is not, as will hereinafter be shown.

Other problems as regards retaining a wedge in a single or double-piece blade holder, when changing an insert, and as regards other holder features and cylindrical inserts in wedge type blade holders are also dealt with in this application.

SUMMARY OF THE INVENTION

This invention relates to cutting tools in general and more particularly to cut-off tools and blade holders with cylindrical cutting inserts and wedge means for retaining the inserts for cutting use.

A two-piece blade is proposed with interfitting and locking parts whereby only one wedge slot opening is required in one end of one blade part. The other blade part includes a supporting shoulder or seat for a cylindrical insert at each end and is reversible end-for-end, as required.

The blade is held in a clamp type holder, so that it is readily adjustable fore and aft, and the interfitting parts assure alignment of the two parts while in service.

The wedge element and its next adjacent wedge slot wall are formed to include means for retaining the wedge in the slot when the insert is removed and/or the supporting blade part is reversed.

Relative alignment of the insert in the wedge slot and of the wedge over it, and in the slot, is assured by having interfitting complementary surfaces between the respective members and, in particular, is assured in the use of cutting inserts formed to include wedge locking and shoulder seating surfaces which are cylindrical in shape.

In those instances where a cylindrical insert is required to have greater cutting strength at its cutting edge, it is formed from an oversized cylindrical blank to include the necessary rake angles, for end and side clearance, and to still have the cylindrical surfaces for wedge locking and seating alignment mentioned.

DESCRIPTION OF THE DRAWINGS

FIGURE 1 is a side elevation of a cut-off tool including a two-piece blade and using a cylindrical insert in accord with the teachings of this invention.

FIGURE 2 is an end view of the cut-off tool shown in the first drawing figure.

FIGURE 3 is an enlarged side elevational view of the insert.

FIGURE 4 is an end view of the insert.

FIGURE 5 is a plan view of the insert showing the side walls relieved, in phantom outline.

FIGURE 6 is a fragmentary end view of the blade holder with its wedge and insert in place.

FIGURE 7 is similar to the last-mentioned drawing figure with a different type of wedge.

FIGURE 8 is a fragmentary side elevational section showing the wedge and insert of FIGURE 7.

FIGURE 9 is a side elevation of another form of cylindrical insert.

FIGURE 10 is a fragmentary side elevation of the end of still another form of cylindrical insert.

FIGURE 11 is a top plan view of the insert shown in FIGURE 10 with phantom lines showing the side relief provided.

FIGURE 12 is an end view of the insert of FIGURES 10 and 11.

DETAILED DESCRIPTION OF THE INVENTION

The cutting tool 10 shown in the drawing is the type used for cut-off purposes. It includes a holder 12 for a blade 14 which has a cutting insert 16 held by a wedge 18 in its forwardly disposed edge.

The holder 12 is essentially rectangular in shape with a protrusion 20 on its back side, by means of which it may be held on edge in a supporting fixture (not shown), and with a flat side wall face 22 against which the insert blade 14 is retained with the end of the blade, which includes the insert, extending beyond the holder part. A supporting ledge 24 is provided on the lower side face edge of the holder and extends its full length to receive and locate the blade 14 square on the holder in cooperation with a clamp 26 on top of the holder.

The clamp 26 includes overhanging side edge with inwardly chamfered lips 28 and 30 that cooperate with like chamfers on the upper back edge of the holder and upper front edge of the blade 14 to hold the blade against the registering side wall 22 of the holder and on the supporting ledge 24. A similarly chamfered lip 32 on the outer edge of the blade supporting ledge 24, and on the lower outer edge of the blade, serve to further assure the secure engagement and retention of the insert blade on the holder without other fastener means.

A lug 34 on the back edge of the holder 12 extends out past the blade seating wall 22 and is drilled and tapped for an adjustment screw 36 by means of which the insert blade may be adjusted forwardly on the holder, when the clamp is loosened.

Although the clamp type holder 12 is particularly well suited for the insert blade 14 shown, other types of holders may be used with like blades or one-piece blades with the features of improvement hereinafter described.

The insert blade 14 is a two-piece blade with parts 38 and 40 that are formed to include an interfitting offset shoulder 42 and recess 44, with a V-groove and edge therebetween, by means of which they may be relatively aligned and the one part 40 may be turned end-for-end, should the end of such part, under the insert 16, become damaged. The blade part 38 is tapered rearwardly at its front edge, over the blade part 40, and is formed to include an opening 46, at its lower front corner, within which is received the cutting insert 16 and its wedge 18.

The blade part 40 is formed to include a supporting ledge and seat 48 for the insert and the wedge 18 serves to retain the insert securely on the ledge seat for cutting purposes.

The advantage of the two-piece blade construction shown is that the insert ledge seat 48 may be renewed, should it become damaged, by turning the blade part 40 end-for-end since a like ledge seat 48' is provided at its opposite end. And, the separate blade part 38 makes it possible to have the insert and wedge opening 46 formed in only one end thereof.

Since cut-off depths are seldom more than an inch or an inch-and-a-half, there is ample support in the holder for the two-piece type blade. However, the present invention is inclusive of both two-piece and one-piece insert blades, and should greater extensions and/or thinner blades dictate the need for a more solid one-piece blade, this course may be followed. The one-piece blade may still be reversible, to renew the insert seat, by having a like opening and blade end configuration in its back edge.

Referring now to the insert and wedge opening 46 in the blade, without distinction between one- and two-piece blades, it will be appreciated as being essentially a pie-shaped slot with inwardly converging side edges 48 and 50; with the side edge 48 providing a seat for the cutting insert 16 and the slot edge 50 serving as a reactionary wall for ramping the wedge 18 down into retaining engagement with the insert to hold it securely on the ledge seat 48.

Referring now to the cutting insert 16, it is shown best in FIGURES 3–5 as being cylindrical in shape and as having a cutting edge 52 in an axial plane of the insert at each end. Behind the cutting edges is a small land 54 and a chip groove relief 56 that is continued to provide a chip curling wall 58 thereover and behind. The cutting edges 52 and their relief therebehind, on relatively opposite ends of the insert, are on relatively opposite sides of the insert, for reasons later described, so that the insert is indexed by being turned end-for-end and over.

End clearance 60 is provided under the cutting edges 52, at each end of the insert, and it will be appreciated that the formation of the chip groove relief 56 from the axial plane which includes the cutting edges and into the half-round portion relatively below such plane of reference, will provide tapered side clearance 62 from the cutting edge rearwardly. This side clearance may be extended further rearwardly, and between the chip groove reliefs at opposite ends of an insert, by wiping the sides of a soft carbide insert, in the course of making it, or otherwise to provide the side flats 64 best shown in FIGURE 3. This is also apparent behind, and both over and below, the cutting edge 52 in the FIGURE 4 view of the insert.

The supporting ledge 48 of the blade 14 has a cylindrical concavity which complements the shape of the insert and assures both good seating engagement for the insert and relative alignment of the insert on the seating ledge and with respect to the blade which carries it. The wedge 18, over the insert 16, similarly has an insert engaging edge 66 formed with an insert complementing cylindrical concavity. The other edge of the wedge, that engages the slot wall 50, may have a cylindrical shape which matches a cylindrical concavity in the slot wall, as shown in FIGURES 2 and 6, or may be flat as shown in FIGURES 7 and 8, and identified as 50'. In both instances the wedge 18 will center itself on the insert and relatively in the blade.

In FIGURE 8 the insert 16 is shown as having back wall engagement against a shoulder 68, provided at the end of its seating groove, and which is disposed to register against the chip curing wall 58 on the insert, at its other end. This fixes the axial location of the insert in the blade, locates the insert in the blade with its cutting edge square, and prevents the insert from rolling in its seating groove.

It will be appreciated that a like shoulder stop could be disposed to engage the extreme end of the insert and to serve a like purpose. It might still be at the end of the insert seating groove, with a hat-shaped insert like that shown in FIGURE 9, or it might be provided from relatively over the insert, either from the back wall or on an insert clamp having no appreciable rearward relative movement when applied.

The cutting edge of the insert that is disposed for cutting use may also be held square, and the insert kept from rolling, by having its reserve cutting edge land 54 seat on the back wall ledge 70 that extends forward to provide the back wall shoulder stop. However, the problems of close tolerance dimensioning to accomplish this and the chance of damage to the reserve cutting edge are best avoided by the arrangement shown.

In passing, it will be noted that the blade holder 12 has a small recess 72 formed in its side wall face 22 from its front edge rearwardly in the vicinity of the insert 16 to accommodate the slightly wider dimension of the reserve cutting edge as compared to the blade thickness.

The wedge 18 is shown in the different drawing figures as having its inner end relieved, on its insert engaging edge, to provide a tail 74 and more of a wedge foot for applying wedge pressure to the insert at its midsection. The tail on the insert wedge has its relatively opposite edges parallel to each other and is received in an extension 76 of the wedge and insert slot 46, with like parallel walls, to guide the wedge as it is placed in service and assure that the wedge clamping foot or edge 66 applies a like uniform pressure along the full length of its area of engagement with the insert. The wedge foot assures that the wedge pressure will be at the strong midsection of the insert and not over its reserve end.

An optional feature for the wedge 18 is shown in FIGURE 8, by means of which it may be relatively retained in a one-piece blade when changing or indexing an insert. This includes a shoulder stop portion 78 and cooperating recess 80 between the reactionary edge wall 50' of the wedge slot opening and the next adjacent edge of the wedge. The wedge may be loosened but will not pull out with the insert. However, it easily inserted and removed sideways with respect to the wedge slot.

FIGURE 9 shows an insert 116 that has its opposite ends formed as mirror images and is somewhat hat-shaped in its side elevational view. However, it is formed from a cylindrical blank, like the other insert and has most of the important attributes of the other insert. A modified wedge form for retention in the blade may be used with this insert, or, as even with the other insert, a different type of insert clamp may be used and applications for this and the other form of insert in milling, boring and other cutting tools are numerous.

FIGURES 10–12 show just one end of a cutting insert 216, which may have like or relatively reversed cutting ends and which avoid the problems of an appreciably reduced cross-section behind the cutting edge, when small-sized inserts would be advisable, while still preserving the major features of the insert described.

An over-sized cylindrical blank is used to make the insert 216 and relatively opposite sides are ground, cut or otherwise formed on like arcs 82 so that there is side relief behind the cutting edge. The cylindrical form of the insert is still evident on its top and bottom edges so that blade and wedge seating advantages are still present. Similarly, when the chip relief groove 256 is formed, it rakes back into the side clearance and when the end clearance 260 is provided there is taper back under the cutting edge.

With each of the inserts 16, 116 and 216, it will be appreciated that no chip breaker is needed since the inserts have a chip breaker wall formed integrally over their cutting edges and behind their chip relief grooves. No appreciable chip wear will be experienced since there is no break in the chip curling wall, as when separate chip breakers are used, and the cutting grade of the insert assures the best in wear resistance. It follows also that the insert retaining wedge will not be subject to chip breaking pressures since it no longer serves such a purpose.

The inserts shown and described, and like inserts embodying the teachings that have been set forth, may be used in other types of cutting tools, as previously mentioned, and may either be preformed in soft carbide, to the shape specified, or from cylindrical blanks which are standards in the field. They are structurally sound and securely retained, to assure good seating characteristics and long cutting life, and are both indexible and readily renewed, in cut-off or other tools, as and when necessary.

I claim:

1. A cutting tool using cylindrical shaped cutting inserts, and comprising; a holder having a wedge slot formed in a peripheral edge thereof and with one edge wall of the slot formed to receive a cylindrical shaped cutting insert in seating engagement and axial alignment thereon, said cutting insert having a transverse shoulder and said slot being provided with a registration surface for said shoulder serving to rotatively orient said insert, a wedge member received in said slot and having the insert engaging edge thereof formed to complement the cylindrical shape of the insert for axial orientation of said wedge relative to said insert and in said wedge slot, and means for fixing the radial disposition of the wedge over the insert and in the plane of the holder provided between said wedge and its slot wall.

2. The cutting tool of claim 1, said wedge and its slot wall having a complementary cylindrical shape.

3. The cutting tool of claim 1, said wedge and its slot wall being relatively flat and normal to the axial centerline plane through said insert and wedge slot.

4. The cutting tool of claim 1, said wedge and wedge slot being formed to include rearward extensions for guiding said wedge and retaining it relatively in said slot when loosened to remove an insert.

5. A cutting tool using cylindrical shaped cutting inserts, and comprising; a holder having a wedge slot formed in a peripheral edge thereof and with one edge wall of the slot formed to receive a cylindrical shaped cutting insert in seating engagement and axial alignment thereon, a wedge member received in said slot and having the insert engaging edge thereof formed to complement the cylindrical shape of the insert for axial orientation of said wedge relative to said insert and in said wedge slot, and means for fixing the radial disposition of the wedge over the insert and in the plane of the holder provided between said wedge and its slot wall, said wedge and wedge slot being formed to include rearward extensions for guiding said wedge and retaining it relatively in said slot when loosened to remove an insert, said wedge and its slot wall being formed to include a shoulder stop and recess limiting the outward movement of the wedge from the slot when loosened to remove an insert.

6. A cutting tool using cylindrical shaped cutting inserts, and comprising; a holder having a wedge slot formed in a peripheral edge thereof and with one edge wall of the slot formed to receive a cylindrical shaped cutting insert in seating engagement and axial alignment thereon, a wedge member received in said slot and having the insert engaging edge thereof formed to complement the cylindrical shape of the insert for axial orientation of said wedge relative to said insert and in said wedge slot, and means for fixing the radial disposition of the wedge over the insert and in the plane of the holder provided between said wedge and its slot wall, said holder including two interfitting parts and with one reversible end-for-end relative to the other thereof and having an insert seating surface provided on each end thereof.

7. The cutting tool of claim 6, said wedge slot being formed substantially within the other of said holder parts at a lower disposed corner on one end thereof and to have an insert seating surface forming a defining edge wall thereof.

References Cited

UNITED STATES PATENTS

| | | | |
|---|---|---|---|
| 500,834 | 7/1893 | Youngs | 29—96 |
| 687,237 | 11/1901 | Jackson | 29—96 |
| 992,860 | 5/1911 | Dette | 29—96 |
| 1,420,171 | 6/1922 | Wille | 29—96 |
| 2,556,723 | 6/1951 | Hoffart | 29—96 |
| 2,644,224 | 7/1953 | Chilcott | 29—96 |
| 2,836,426 | 5/1958 | Crawford | 29—96 X |
| 3,087,230 | 4/1963 | Comire | 29—96 |

HARRISON L. HINSON, Primary Examiner

U.S. Cl. X.R.

29—97